United States Patent

[11] 3,615,788

| [72] | Inventors | Jack L. Limbert<br>Daleville;<br>Harry G. Proctor, Muncie; David T. Poe, Gaston, all of Ind. |
|---|---|---|
| [21] | Appl. No. | 871,341 |
| [22] | Filed | Oct. 30, 1969 |
| [23] | | Division of Ser. No. 780,067, Nov. 29, 1968, Pat. No. 3,523,041 |
| [45] | Patented | Oct. 26, 1971 |
| [73] | Assignee | General Motors Corporation<br>Detroit, Mich. |

[54] BATTERY PASTE EXPANDER MATERIAL
2 Claims, 1 Drawing Fig.

[52] U.S. Cl. .................................................. 106/123
[51] Int. Cl. .................................................. C08h 15/02
[50] Field of Search .......................................... 106/123; 136/26; 260/124

[56] References Cited
UNITED STATES PATENTS
2,217,786  10/1940  Birt et al. ..................... 260/124

OTHER REFERENCES
Felicetta " Molecular Weight of Certain Lignin Sulfonates" 1899– 1901 1955

*Primary Examiner*—Morris Liebman
*Assistant Examiner*—T. Morris
*Attorneys*—William S. Pettigrew, R. J. Wallace and Lawrence B. Plant ABSTRACT: A battery paste expander material for the negative plate of a lead-acid storage battery including lignosulfonic acid in the molecular weight range of about 20,000 to 30,000 g/g-mol, less than about 1 percent carbohydrates and about 3–8 percent combined sulfur.

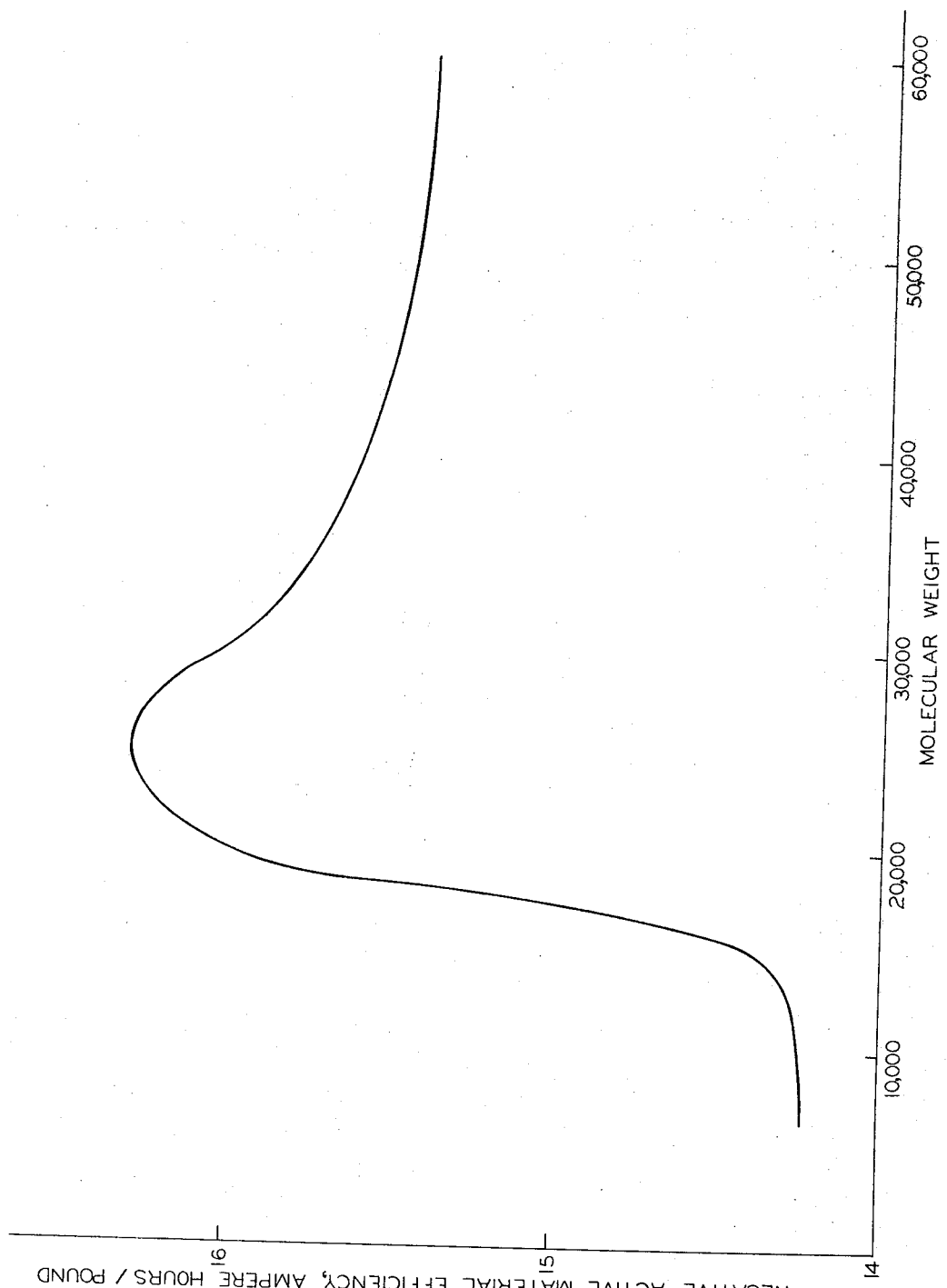

BATTERY PASTE EXPANDER MATERIAL

This application is a division of application Ser. No. 780,067 now U.S. Pat. No. 3,523,041 entitled "BATTERY PASTE EXPANDER MATERIAL." filed Nov. 29, 1968 in the names of Jack L. Limbert, Harry G. Proctor and David T. Poe, and assigned to the assignee of this application.

It is common practice to add expander material to the negative plates of lead acid storage batteries to prevent contraction on solidification of the spongy lead and the consequent loss of capacity and life of the finished battery. These expanders are normally added to the negative paste material in very small amounts, usually less than about 3 percent of the total weight of the paste. These expanders have traditionally included finely divided carbons such as lampblack or carbon black, etc., barium sulfate and sawdust, wood flour or organic extracts of wood. Among the organic extracts of wood which have been used are the waste sulfite liquors which are byproducts of the papermaking industry.

Lignosulfonic acid is the principal ingredient of waste sulfite liquors which has expander properties. The other materials, i.e., sugars, phenols and conidendrin, do not possess expander properties and do not chemically interfere with the expander action of the lignosulfonic acid. However, their presence, as inactives, does reduce the expander action somewhat, apparently by some physical blocking or interference mechanism. Accordingly, it is desirable to separate the lignosulfonic acid from these inactives by any convenient process such as disclosed in Pritchard et al. U.S. Pat. No. 2,325,542. Such separation processes provide a waste sulfite liquor concentrate rich in lignosulfonic acid and low in residual sugars (e.g., about 10 percent). This concentrate is added to the negative paste usually with some lampblack and barium sulfate. We have found that improvements in negative plate performance, in terms of ampere-hours per pound (a.-hr./lb.) of paste, may be realized by limiting the addition of the lignosulfonic acid to a selected molecular weight range and still further improved by substantially reducing the concentration level of the residual sugars.

Accordingly, it is an object of our invention to provide an improved expander material and negative paste material formed therefrom in order to increase the battery's performance in terms of capacity and life.

The FIGURE shows a graph which depicts the improved battery performance as a function of the molecular weight of the lignosulfonic acid.

Briefly stated, our invention resides in providing an improved organic expander material for the negative plates of a lead-acid storage battery in which the expander material has as its principal constituent lignosulfonic acids at least about 95 percent of which have molecular weights in the range of 20,000 to 30,000. Further improvements are noted when the concentration of the sugars (carbohydrates) is reduced to less than about 1 percent. The requisite level of solubility is maintained when the degree of sulfonation is such that the sulfur content is about 3 to 8 percent by weight of the lignosulfonic acid.

Because of the increased performance which results from this expander, substantial materials savings are realizable with respect to the production of batteries having specific rated capacities. In the alternative, because of this invention batteries having higher capacities can now be made for substantially the same cost as batteries having lesser capacities, to the extent that cost is related to the cost of the negative plate material.

In its most preferred form, our expander contains lignosulfonic acids in which the bulk of the lignosulfonic acid present has molecular weights between 20,000 and 30,000 and an average molecular weight of about 35,000. Isolation of these heavier lignosulfonic acids is accomplished by fractionation of the waste sulfite liquor concentrates. It is appreciated, that in any cut or fraction, there will be a certain proportion of the cut which has lower and higher molecular weights. If proper care is taken in the separation process at least about 95 percent of the lignosulfonic acid present will be in the desired 20,000 to 30,000 g./g.-mole molecular weight range. As the yield of the preferred (20,000–30,000) high molecular weight acids decreases in favor of the lower and higher molecular weight acids, its effectiveness as an improved organic expander also decreases.

The FIGURE depicts the improved performance obtainable when using lignosulfonic acid expanders in which the lignosulfonic acid fractions have molecular weights in the preferred range. As the average molecular weight falls below or above the preferred range, it is readily seen that the ampere-hour capacity falls off.

As a result of fractionating the lignosulfonic acid concentrates, a further benefit is obtained by eliminating, or at least substantially reducing (i.e., less than about 1 percent) the concentration of the sugars otherwise present in even concentrated waste sulfite liquors. The sugars seem to attach to the lower molecular weight lignosulfonic acids and accordingly are removed when the lower lignosulfonic acids are discarded. While not directly detrimental to the expander, the sugars block or otherwise fill adsorption sites on the negative active material, which would otherwise be available to the lignosulfonic acid. Still further expander action improvement results from controlling the degree of sulfonation of the lignosulfonic acid. A high degree of sulfonation, i.e., in excess of about 8 percent by weight sulfur, results in an extremely soluble lignosulfonic acid. The soluble lignosulfonic acids dissolve in the electrolyte and, after a period of time, significantly reduce the expander action of the lignosulfonic acid remaining in the plate. On the other hand, too low a concentration of the sulfur, i.e., less than about 3 percent by weight, results in the formation of extremely insoluble lignosulfonic acids which are also undesirable. Insoluble lignosulfonic acids are not acceptable expanders. We have found that for lignosulfonic acids in the 20,000–30,000 molecular weight range the sulfur content should be maintained in the range of about 3 to 8 percent (preferably 5–6 percent) by weight of the total lignosulfonic acids present. At this sulfur level, the degree of solubility seems to produce the best expander action.

The improved lignosulfonic acid expander may be introduced into the negative plates in a variety of ways. In all cases observed, when the improved lignosulfonic acid was substituted for the waste sulfite liquor derivatives and formed into negative plates in the same manner as the waste-sulfite liquor "expanderized" plates were formed, the high molecular weight lignosulfonic acid plates consistently out-performed the waste sulfite liquor plates. The improved lignosulfonic acid expander material may be added to the paste in any of the three more or less accepted ways of preparing negative battery paste. These three accepted ways generally include (1) adding dry oxide to a slurry containing the expander material, (2) adding dry oxide to a cooked and dried expander material including the lignosulfonic acid and adding water thereto, and (3) mixing the lead-oxide, barium sulfate, carbon black and lignosulfonic acid in the dry form and merely adding water thereto. However, in one instance, some improved life was observed when the organic expander material was added after the barium sulfate, sawdust, carbon black and mixture was first cooked and dried. In this case the dried mixture and lead-oxide are mixed together and subsequently water containing the lignosulfonic acid blended therewith.

For purposes of demonstrating our invention, several batches of expanders will be prepared in accordance with the procedures disclosed in Hindall U.S. Pat. No. 2,436,299, the applicable portions of which are herein intended to be incorporated by reference. A first batch thusly prepared contained a conventional waste sulfite liquor organic addition. Typical of the composition of such waste sulfite liquors is about 0.5 percent conidendrin, 0.5 percent phenols, 35.0 percent sugars (carbohydrates) and lignosulfonic acid salts 64.0 percent on a weight basis as determined by the Institute of Paper Chemistry. The lignosulfonic acid is the ingredient which provides the expander properties and is itself comprised of about 81 percent lignin, 13 percent sulfonic groups (5.2 percent sulfur)

and 6 percent cations such as Ca Na, or NH₄. More specifically, the waste sulfite liquor sold under the trademark ORZAN AL—50 was used for these tests. ORZAN AL–50 is a specific waste sulfite liquor made from hemlock and contains ammonium cations, lignosulfonic acids having molecular weights ranging from about 6,000 to 50,000 (average weight—14,000), and about 11 percent sulfonic groups. This first batch was used to make negative plates which were used as controls. The negative test plates were made on the basis of 26 lbs. of expander per 3,000 lbs. of paste so that the final paste contained about 0.13 percent lignosulfonic acid, 0.105 percent carbon black and 0.21 percent barium sulfate. Other expander batches were prepared in virtually the same manner as that using ORZAN AL–50, except that the organic expander contained higher percentages of the higher molecular weight lignosulfonic acids. These organic expanders were substituted for the ORZAN AL–50. Test negative paste was then made from these expander batches such that the final test plates, like the control, contained 0.13 percent lignosulfonic acid (higher molecular weight), 0.21 percent barium sulfate, and 0.105 percent carbon black. Test plates containing 80.0 grams of dry paste were then made and assembled into cells and batteries and subjected to performance tests. The performance tests amounted to discharging the cells at 300 amps at 0° F. and measuring the time required for the terminal voltage to drop to a given level (0.83 v./cell or 5 v./battery). From this information and the known amount of active material, the efficiencies of the negative plate active materials were calculated and compared in terms of amps-hr./1b. Table I shows the results of such a test on the second discharge cycle (i.e., after one discharge and one recharge cycle).

TABLE I

Ampere-Hr./No. Efficiencies

| Test 0 | Sample No. | | | | |
|---|---|---|---|---|---|
| | 1 | 2 | 3 | 4 | 5 |
| 1 | 12.2 | | 12.1 | | |
| 2 | 11.8 | 11.6 | | | |
| 3 | 12.3 | 12.1 | | | 13.2 |
| 4 | 12.8 | | | 13.2 | |
| 5 | 12.1 | | 12.2 | 12.0 | 12.9 |
| 6 | 10.2 | | 11.1 | 10.9 | 12.1 |
| 7 | 12.5 | | | | |
| *8 | 11.3 | 12.0 | | | |
| *9 | 11.6 | | 11.6 | 12.1 | 12.4 |
| Average | 11.8 | 11.9 | 11.9 | 12.1 | 12.6 |

*Complete battery

Table II shows the results of such tests on the fifth discharge cycle (i.e., after four discharge and four recharge cycles).

TABLE II

Ampere-Hr./No. Efficiencies

| Test 0 | Sample No. | | | | |
|---|---|---|---|---|---|
| | 1 | 2 | 3 | 4 | 5 |
| 1 | 11.6 | | 11.7 | | |
| 2 | 10.2 | 11.2 | | | |
| 3 | 11.6 | 12.9 | | | 13.5 |
| 4 | 12.8 | | | 12.9 | |
| 5 | 11.5 | | 11.9 | 11.7 | 13.0 |
| 6 | 9.9 | | 10.8 | 11.0 | 12.1 |
| 7 | 12.6 | | | | |
| *8 | 9.9 | 11.1 | | | |
| *9 | 10.5 | | 11.9 | 12.3 | 12.8 |
| Average | 11.2 | 11.7 | 11.6 | 12.0 | 12.8 |

*Complete battery

Table III shows the results of such tests after SAE cycling (i.e., 30 cycles).

TABLE III

| Test 0 | Ampere-Hr./No. Efficiencies | | |
|---|---|---|---|
| | Sample No. | | |
| | 1 | 2 | 3 |
| 1 | 7.7 | | 9.1 |
| 2 | 6.7 | 8.3 | |
| 3 | 6.6 | 8.1 | |
| 4 | 7.1 | 8.6 | |
| Average | | 8.3 | 9.1 |

With respect to tables I, II and III above, sample 1 is the control using the ORZAN AL–50 organic expander while the other samples represent, in numerically increasing order, pastes containing lignosulfonic acid expanders having increasing proportions of higher molecular weight lignosulfonic acids. Based on the average data, it is clearly shown that significant improvements in plate efficiency are found in those plates made from the higher molecular weight lignosulfonic acids.

To more definitively establish the boundaries of our discovery, further tests were conducted to bracket the critical lignosulfonic acid molecular weight range where the significantly improved expander properties were found. Toward this end, ORZAN AL–50 was selected as the starting material and specific cuts or fractions were taken therefrom. The fractionating process consisted briefly of reacting the total ORZAN AL–50 with dicyclohexylamine and extracting the solution with 1-Butanol. This process separates the lignin from the nonlignin substances which are present in the ORZAN starting material. The Butanol solution was then extracted with one normal NaOH and the resulting aqueous solution was resin treated to the acid form. The lignosulfonic acid was neutralized and the diluted solution was then passed through a fractionating column sold under the trademark SEPHADEX G—50 and collected. The fractions were numbered and the lignosulfonic acid molecular weights and distribution determined for each fraction. The molecular weight determinations of the several fractions were taken according to the procedure outlined in Journal of Japanese Tappi, Vol. 14, p. 589, Studies of Ligninsulfonic Acids, III. All molecular weights disclosed and claimed herein have been determined by and based on this procedure. It is recognized that other methods may yield different numerical values, but it is believed that the numerical values determined by these other methods can be correlated to those disclosed and claimed herein and should be considered as equivalents to the values recited herein. In other words, the molecular weights disclosed and claimed herein are not intended to reflect absolute numerical values, but merely the values determined by the aforesaid procedure. Negative paste was formulated using the aforesaid several fractions. Negative plates were made therefrom. Three-plate cells (one negative and two positive) were then used and discharged at 60 amps at 0° F. to a cutoff terminal voltage of 0.83 volts. The time required to reach the cutoff terminal voltage was recorded. From this information and the known amount of active material (80.0 grams) the efficiency of the active material in terms of ampere-hours per pound was calculated and compared. The FIGURE (graph) reflects the results of these tests and clearly shows that those fractions containing principally (i.e., about 95 percent) lignosulfonic acids with molecular weights ranging from about 20,000 to 30,000 produced superior results.

The fractions in the 20,000–30,000 molecular weight range contained less than about 1 percent sugar (carbohydrates), about 5 percent inorganic salts and had a sulfur content of about 7 percent. The extremely low sugar content further contributes to the effectiveness of the expander.

Negative battery paste made utilizing the improved higher molecular weight lignosulfonic acid expanders of this invention will generally include up to about 0.2 percent by weight finely divided carbon such as carbon black, lampblack or the like (preferred: about 0.15 percent), up to about 3.0 percent by weight barium sulfate (preferred: less than about 1.0 percent), less than about 1.0 percent high molecular weight (20,000–30,000 grams/grams-mole) lignosulfonic acids, and the balance principally lead oxide. The lignosulfonic acids are preferably added in quantities varying between about 0.1 percent to about 0.5 percent by weight and most effectively about 0.25 percent by weight. Though not necessary, it is desirable to also add less than about 1 percent nickel sulfate to lower the battery's counter-EMF on recharge.

While this invention has been described solely in terms of certain specific embodiments thereof, it is intended that it be limited only to the extent hereinafter defined.

1. An expander for the negative active material of a lead acid storage battery said expander comprising an admixture of finely divided carbon, barium sulfate and an organic ingredient, said organic ingredient consisting essentially of lignosulfonic acids in the molecular weight range of about 20,000 grams/grams-mole to about 30,000 grams/grams-mole.

2. An expander for the negative active material of a lead-acid storage battery comprising an admixture of finely divided carbon, barium sulfate and an organic ingredient said ingredient consisting essentially of lignosulfonic acids in which at least about 95 percent of said lignosulfonic acids are in the molecular weight range of about 10,000 grams/grams-mole to about 30,000 grams/grams-mole, less than about 1 percent by weight carbohydrates, about 3 percent to about 8 percent by weight sulfur, and less than about 5 percent by weight cations selected from the group consisting of calcium, sodium, and ammonium.

* * * * *

PO-1050
(5/69)

UNITED STATES PATENT OFFICE
CERTIFICATE OF CORRECTION

Patent No. __3,615,788__   Dated __October 26, 1971__

Inventor(s) __Jack L. Limbert, David T. Poe and Harry G. Proctor__

It is certified that error appears in the above-identified patent and that said Letters Patent are hereby corrected as shown below:

Column 1, line 69, "35,000" should read -- 25,000 --.
Column 4, Table III, line 16, after "average" insert -- 7.0 --.
Column 6, line 12, "10,000" should read -- 20,000 --.

Signed and sealed this 6th day of June 1972.

(SEAL)
Attest:

EDWARD M. FLETCHER, JR.                 ROBERT GOTTSCHALK
Attesting Officer                        Commissioner of Patents